(12) United States Patent
D'Agostini

(10) Patent No.: US 8,556,340 B2
(45) Date of Patent: Oct. 15, 2013

(54) VEHICLE SEAT RECLINER MECHANISM WITH SELECTIVE TORQUE TRANSMISSION CONNECTORS

(75) Inventor: Roberto D'Agostini, Piossasco (IT)

(73) Assignee: Lear Corporation, Southfield, MI (US)

( * ) Notice: Subject to any disclaimer, the term of this patent is extended or adjusted under 35 U.S.C. 154(b) by 419 days.

(21) Appl. No.: 12/849,057

(22) Filed: Aug. 3, 2010

(65) Prior Publication Data

US 2012/0032481 A1 Feb. 9, 2012

(51) Int. Cl.
*B60N 2/24* (2006.01)

(52) U.S. Cl.
USPC .................................. 297/216.14; 297/354.12

(58) Field of Classification Search
USPC .............................. 297/216.14, 354.1, 354.12
See application file for complete search history.

(56) References Cited

U.S. PATENT DOCUMENTS

| | | | |
|---|---|---|---|
| 4,008,920 A | 2/1977 | Arndt | |
| 4,335,917 A | 6/1982 | Izuno et al. | |
| 4,576,412 A | 3/1986 | Terada | |
| 4,708,392 A | 11/1987 | Werner et al. | |
| 4,832,405 A | 5/1989 | Werner et al. | |
| 6,619,743 B1 | 9/2003 | Scholz et al. | |
| 7,201,447 B2 | 4/2007 | Yamada | |
| 7,261,373 B2 | 8/2007 | Tanaka et al. | |
| 7,314,250 B1 | 1/2008 | Eblenkamp et al. | |
| 7,717,509 B2* | 5/2010 | Kojima | 297/216.2 |
| 7,992,938 B2* | 8/2011 | Kojima et al. | 297/354.12 |
| 8,434,823 B2* | 5/2013 | Du et al. | 297/362.11 |
| 2003/0227205 A1* | 12/2003 | Villarroel | 297/354.12 |
| 2006/0145522 A1* | 7/2006 | Yamada | 297/367 |
| 2007/0085397 A1* | 4/2007 | Tanaka et al. | 297/354.12 |
| 2010/0127546 A1* | 5/2010 | Dziedzic | 297/367 R |
| 2010/0187878 A1* | 7/2010 | Funk et al. | 297/232 |
| 2011/0006575 A1* | 1/2011 | Sankaran et al. | 297/354.1 |
| 2011/0109142 A1* | 5/2011 | Kojima et al. | 297/354.12 |
| 2011/0156462 A1* | 6/2011 | Lim et al. | 297/354.12 |
| 2013/0099532 A1* | 4/2013 | Izumida et al. | 297/216.14 |

* cited by examiner

*Primary Examiner* — David E Allred
(74) *Attorney, Agent, or Firm* — Brooks Kushman P.C.

(57) ABSTRACT

A vehicle seat is provided with a pair of discontinuous reclining mechanisms on opposite sides of the seat that are connected by a connecting rod. A pair of torque transmission joints are provided on opposite ends of the connecting rod. The torque transmission joints connect the opposite ends of the connecting rod to the reclining mechanisms. The torque transmission joints permit torque to be transmitted by manipulation of a handle to adjust the vehicle seat. Loads applied from the rear to the vehicle seat back are prevented from transmitting torque to the connecting rod by a lost motion connection provided by the torque transmission joints.

7 Claims, 4 Drawing Sheets

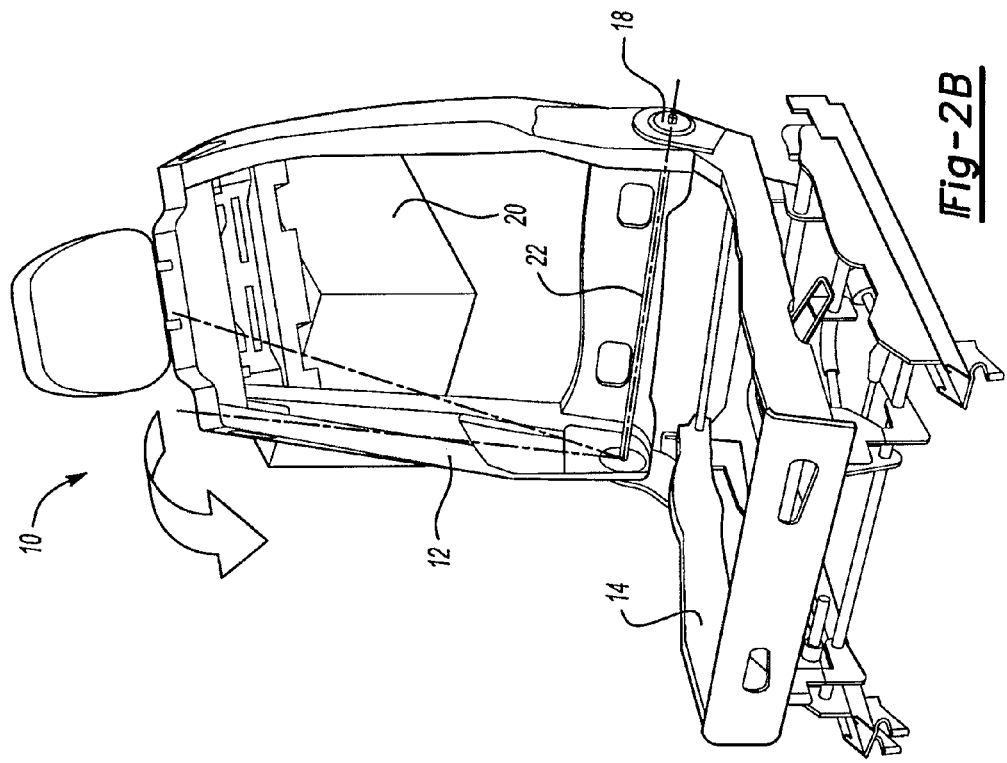
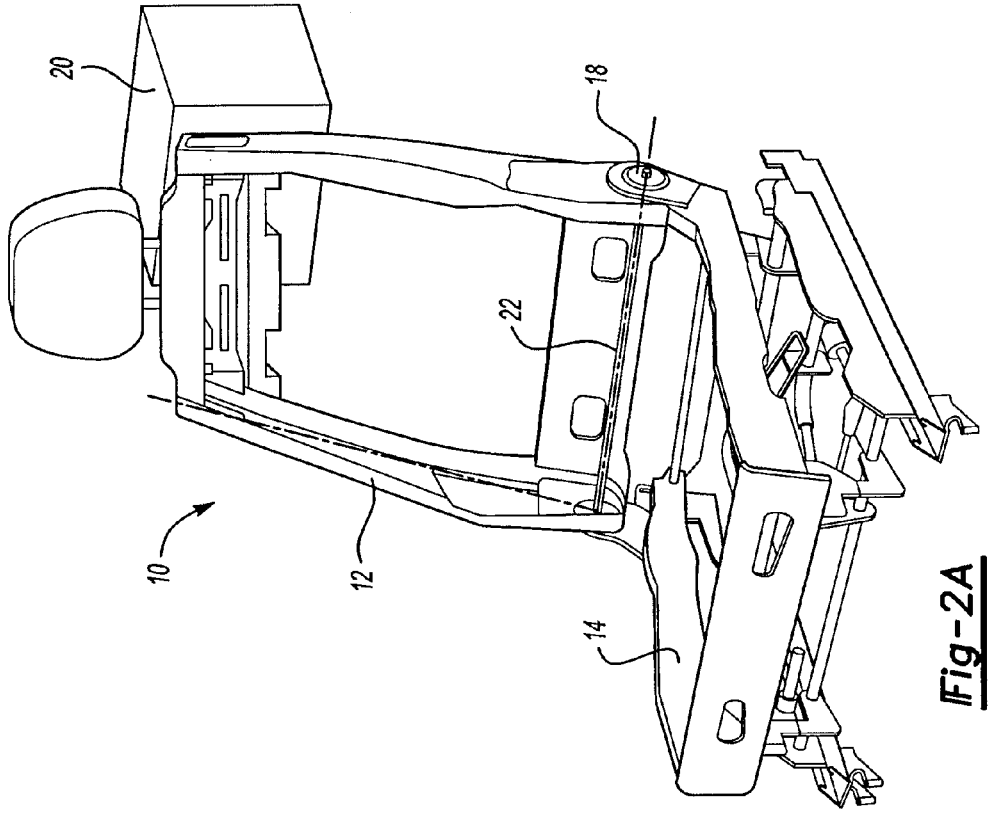

VEHICLE SEAT RECLINER MECHANISM WITH SELECTIVE TORQUE TRANSMISSION CONNECTORS

TECHNICAL FIELD

This development relates to reclining mechanisms for vehicle seats that are locked in a desired angular orientation and may be released and reset at a different angular orientation.

BACKGROUND

Vehicle seats are provided with recliner mechanisms that permit an occupant to adjust the angle of the seat back to the seat base of the seat. Recliner apparatus are classified as either continuous or discontinuous. A continuous recliner generally includes a wobble gear set that is rotated to change the pivot angle of the seat. A discontinuous recliner normally has a handle or other latch mechanism that is used to release the recliner mechanism. The seat back is either pushed back by the occupant or biased by a spring to a default position.

Vehicle seats are tested for seat frame deformation during simulated collision tests. One test for seat frames involves resistance to impact from an object, such as a piece of luggage. The vehicle seat is tested by applying a load to the rear portion of the back rest with sufficient force to deform the back rest frame. One failure mode of this test is whether the force of impact on the seat back releases the seat back lock mechanism of the recliner.

The above problems are addressed by Applicant's invention as summarized below.

SUMMARY

According to one aspect of the disclosure, a vehicle seat is provided that includes a seat base and a seat back that are interconnected by a pair of recliners that pivotally connect the seat back to the seat base in a range of angular orientations. Recliners are normally maintained in a locked condition in which the seat back is positioned at a selected angular orientation relative to the seat base. Recliners are manually shifted to an unlocked condition in which the seat back may be repositioned to set a new selected angular orientation relative to the seat base.

A selective torque transmission connector may be provided with discontinuous recliners to connect a pair of recliners on opposite sides of the vehicle seat to a connecting rod that coordinates operation of the two recliners. The connecting rod allows torque transmission between two recliners during adjustment. While it is a principal purpose of the connecting rod to transmit torque between the recliner mechanisms on opposite sides of the vehicle seat, it is also imperative that torque not be transmitted when a load is applied to the seat back from the rear.

A pair of selective torque transmission joints are each connected to one of the recliners and two opposite ends of a connecting rod. Each selective torque transmission joint has a lost motion connector. The torque transmission joints permit torque to be transmitted between the recliners by the connecting rod when the recliners are manually pivoted in a first rotary direction to the unlocked condition. The lost motion connector prevents torque from being transmitted in a second rotary direction that is opposite the first rotary direction between the recliners by the connecting rod in the event that a load is applied to the seat back in a collision.

According to another aspect of the disclosure, a connecting rod assembly for a vehicle seat is provided with a pair of recliner adjustment mechanisms that are located on opposite sides of the vehicle seat. The recliner adjustment mechanisms are used to adjust the angular orientation of a seat back relative to a seat base. The torque rod connector includes a pair of selective torque transmission joints that each include a lost motion connector. Opposite ends of a connecting rod are connected to the selective torque transmission joints. The selective torque transmission joints transmit torque between the recliners through the connecting rod when the recliners are used to adjust the tilt angle of the seat.

According to other aspects of the disclosure, the selective torque transmission joints may include an inner member that is received in an outer member and are connected together by a linking element when the recliners are manually pivoted to their unlocked position. The inner and outer members are disconnected by the linking element when a load is applied to the seat back in the collision. The inner member may have a cylindrical outer surface that is received in a nested relationship within a cup-shaped outer member that has an inner cylindrical surface. A tab may be provided on the inner member that extends radially outward from the outer surface. The tab is received in an arcuate slot defined by the outer member. The arcuate slot in the outer member may have a first end that is engaged by the tab to transmit torque from the connecting rod to the recliner when they are manually adjusted. The arcuate slot has a second end that is spaced from the tab to provide a lost motion connector.

According to other aspects of the disclosure, each of the torque transmission joints may have a stub shaft that is coaxial with the connecting rod. The stub shaft connects one of the torque transmission joints to one of the recliners.

According to another aspect of the disclosure, a retaining ring may be secured to the connecting rod with an inner member being assembled to the retaining ring and an outer member being assembled to the inner member. A tab may be provided on the inner member that extends radially outward from an outer surface of the inner member and is received in an arcuate slot defined by the outer member. The arcuate slot has a first end that engages the tab to transmit torque from the connecting rod to the recliner when the recliners are adjusted. The arcuate slot has a second end that is normally spaced from the tab to provide a lost motion connection between the inner and outer members.

These and other aspects of the disclosure will be better understood in view of the attached drawings and the following detailed description of the illustrated embodiment.

BRIEF DESCRIPTION OF THE DRAWINGS

FIG. 2A is a perspective view of a vehicle seat frame diagrammatically illustrating an object such as an article of luggage behind the seat back;

FIG. 2B is a perspective view of a seat frame diagrammatically illustrating deformation of the seat back in a luggage test after the object impacts the seat back;

DETAILED DESCRIPTION

A detailed description of one or more embodiments of the disclosure are provided that represent examples of the invention that may be embodied in various and alternative forms. The figures are not necessarily to scale and some features may be exaggerated or minimized to show details of particular components. The specific structural and functional details of the disclosed embodiments are not to be interpreted as limiting, but merely as a representative basis for teaching one skilled in the art to make and use the invention.

Figure 1:
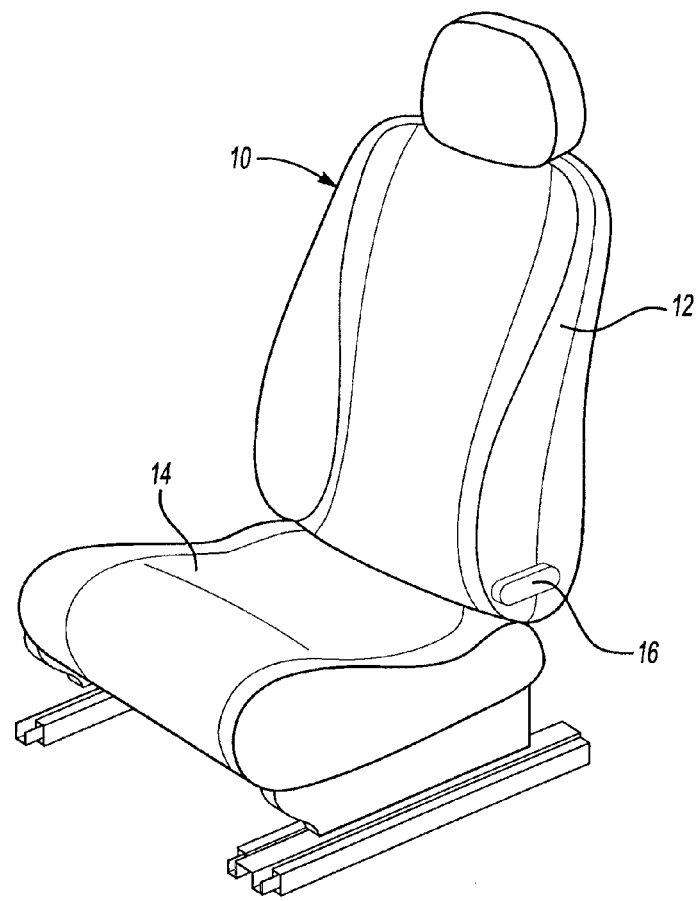
FIG. 1 is a perspective view of a vehicle seat.

Referring to FIG. 1, a vehicle seat 10 is shown to include a seat back 12 and a seat base 14. A handle 16 is provided that is used to adjust the angular position of the seat back 12 relative to the seat base 14.

Referring to FIGS. 2A and 2B, a vehicle seat 10 is shown with the cover and cushions removed to reveal the seat frame structure. The seat back 12 is connected to the seat base 14 by a discontinuous reclining mechanism 18. An object 20 is shown disposed behind the vehicle seat in FIG. 2A. In FIG. 2B the object 20 is shown after impacting the seat back 12 and causing displacement and deformation of the seat back 12. FIGS. 2A and 2B are intended to diagrammatically represent a luggage impact test and the forces applied to the seat back by the object 20. A connecting rod 22 is shown that extends between the discontinuous reclining mechanisms 18 on opposite sides of the vehicle seat 10. The arrow above the vehicle seat in FIG. 2B illustrates the direction of force applied to the seat back 12 by the object 20 and the phantom lines show the deformation of the seat back 12 caused by the impact of the object 20. Deformation of the seat back 12 tends to create a pivotal moment about the connecting rod 22.

Figure 3:
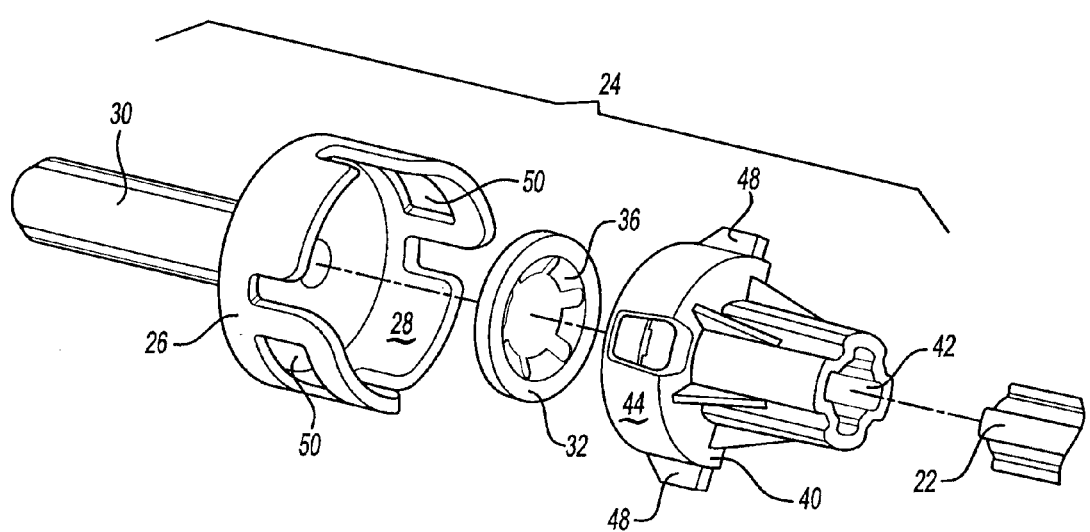
FIG. 3 is an exploded perspective view of a torque transmission joint made according to one embodiment of the disclosure.

Referring to FIG. 3, the structure of the torque transmission joint 24 is shown in greater detail. The torque transmission joint 24 includes an outer member 26 that has an inner surface 28. The outer member 26 is generally cup-shaped and is formed to include a stub shaft 30. The stub shaft 30 is adapted to be received in one of the discontinuous reclining mechanisms 18. A retainer 32 includes a plurality of spring fingers 36. The retainer 32 is used to secure an inner member 40 of the torque transmission joint 24 to the connecting rod 22. The spring fingers 36 engage the connecting rod 22 to hold the end of the connecting rod 22 in engagement with the inner member 40. A receptacle 42 is defined in the inner member 40 that receives the connecting rod 22. The inner member 40 has an outer surface 44. The inner member 40 is received within the outer member 26 with the inner surface 28 of the outer member 26 in a face-to-face relationship relative to the outer surface 44 of the inner member 40. A pair of tabs 48 are provided that extend outwardly from the outer surface 44 of the inner member 40. The tabs 48 are received in arcuate slots 50. The arcuate slots 50 extend through the inner surface 28 of the outer member 26.

Figure 4:
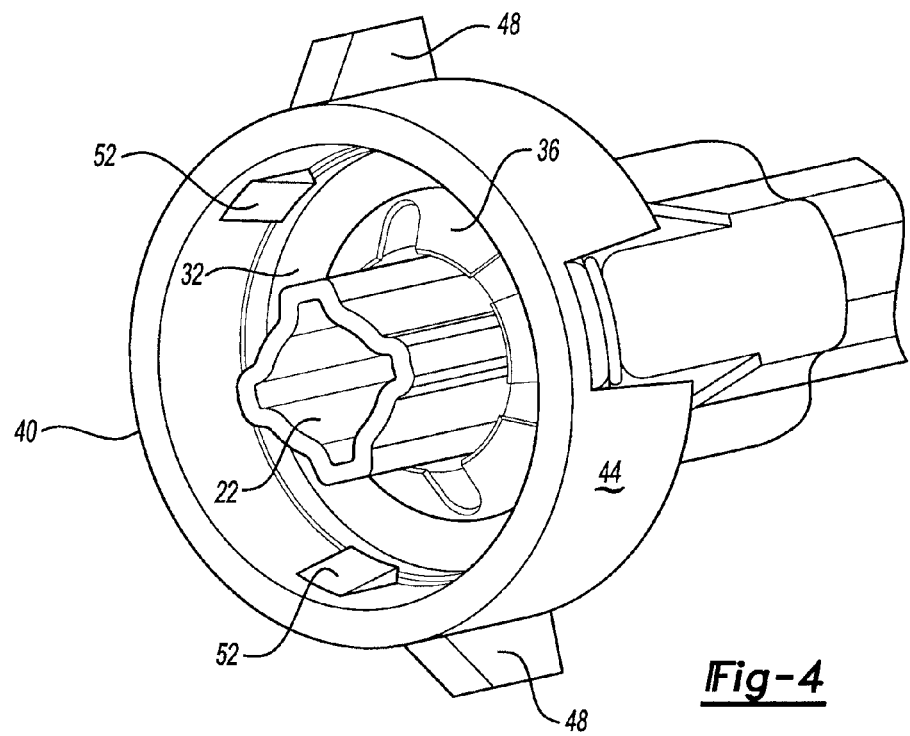
FIG. 4 is a perspective view of the inner member secured to the connecting rod by a retainer.

Referring to FIGS. 3 and 4, the retainer clip 32 is retained within the inner member 40 by a plurality of elastic teeth 52. The elastic teeth engage the retainer clip 32 within the inner member 40.

Figure 5:
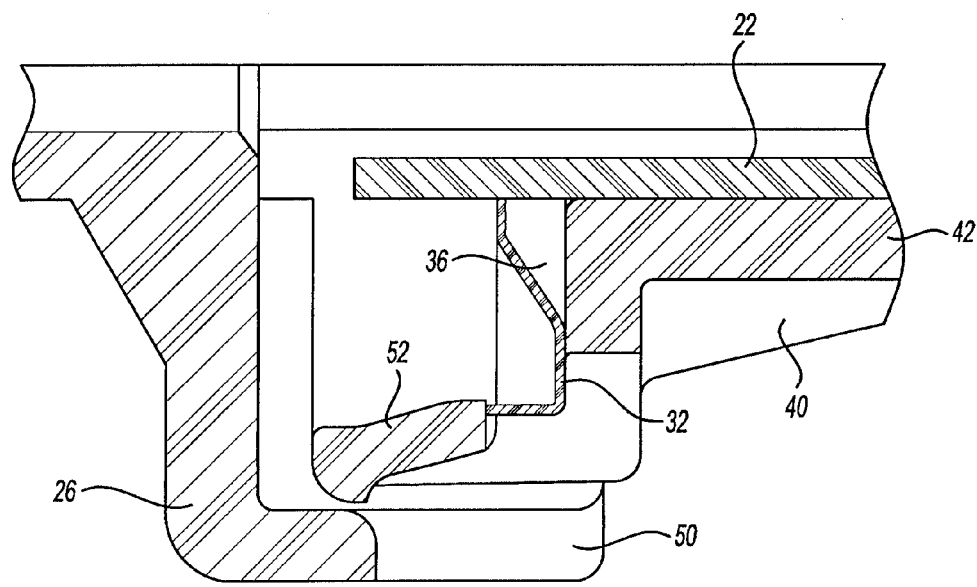
FIG. 5 is a fragmentary cross-sectional view of the outer member, inner member, connecting rod and clip.

Referring to FIG. 5, the outer member 26 is shown assembled over the inner member 40. The connecting rod 22 is received within the receptacle 42 formed on the inner member 40. The retainer clip 32 is shown with the spring fingers 36 engaging the connecting rod 22. One of the teeth 52 is shown engaging the clip 32 to hold the clip within inner member 40. The arcuate slot 50 is also shown in FIG. 5.

Figure 6A:
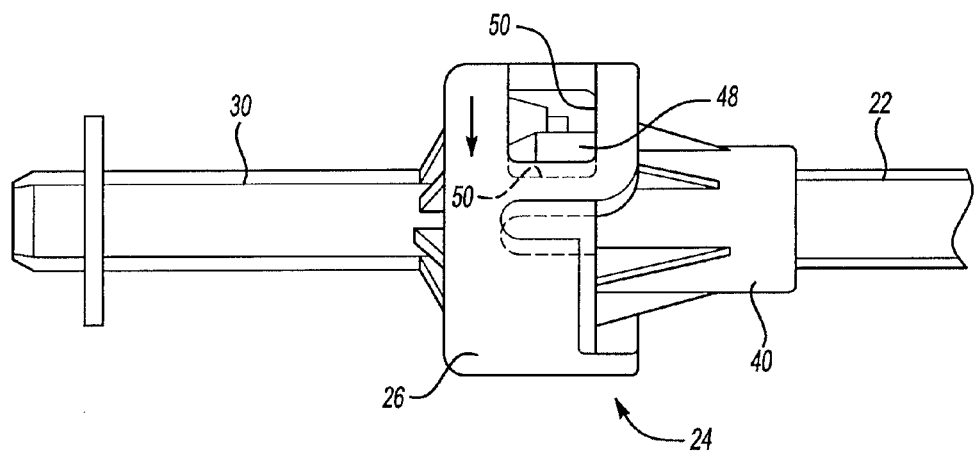
FIG. 6A is a fragmentary elevation view of a left side torque transmission joint.
Figure 6B:
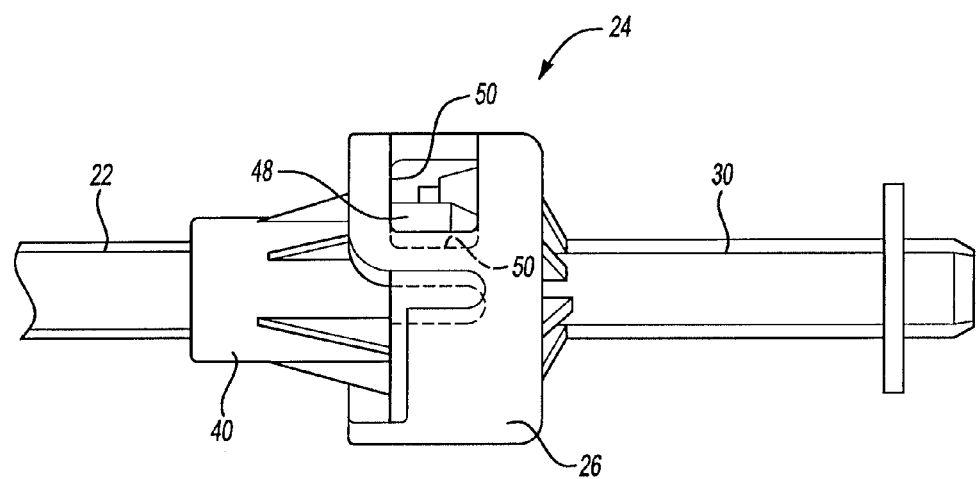
FIG. 6B is a fragmentary elevation view of a right side torque transmission joint.

Referring to FIGS. 6A and 6B, a left and right torque transmission joint 24 are shown as they would be assembled to opposite ends of a connecting rod 22. The outer member 26 is shown with the inner member 40 received within the outer member 26. One of the tabs 48 is shown to be disposed within one of the arcuate slots 50 in solid lines showing the normal position of the tab 48 within the arcuate slot 50.

Phantom lines in FIGS. 6A and 6B show the outer member 26 rotated relative to the tab 48 as would occur in the event of a luggage test impact with the seat back deformed as shown in FIG. 2B. The outer member 26 is rotated relative to the tab 48 in a lost motion connection, wherein motion imparted by the object to the seat back is not transmitted to the tab 48 of the torque transmission joint 24.

In the position shown in solid lines in FIGS. 6A and 6B, torque may be transmitted by a seat occupant moving the handle 16 to rotate the tab 48 and also the outer member 26. The tab 48 engages one end of the arcuate slot 50 to transmit torque through the torque transmission joint 24. Torque can be transmitted between the torque transmission joints 24 in one direction to allow the discontinuous reclining mechanisms 18 to be disengaged by the handle 16 that applies torque to the connecting rod 22.

It should be understood that the discontinuous reclining mechanisms 18 permit torque to be transmitted in normal operation through the connecting rod when it is desired to adjust the angular orientation of the seat back relative to the seat base. However, when a force is applied to the seat back in the opposite direction, tab 48 is permitted to move within the arcuate slot 50 so that no torque is applied if the seat back is impacted from behind and deformed about the connecting rod 22. The selective toque transmission joints inhibit a force applied to the seat back from the rear from potentially disengaging the discontinuous reclining mechanism 18.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
a seat base;
a seat back;
a pair of recliners that connect the seat back to the seat base in a range of angular orientations, the pair of recliners are normally maintained in a locked condition wherein the seat back is positioned at a selected angular orientation relative to a seat base, the recliners are manually shifted to an unlocked condition wherein the seat back may be repositioned to set a new selected angular orientation relative to the seat base;
a pair of selective torque transmission joints are connected to each other by a connecting rod and are each connected to one of the recliners, and each selective torque transmission joint has a lost motion connector, wherein each of the selective torque transmission joints includes an inner member that is received in an outer member, the outer member comprises a slot and the inner member comprises a tab received in the slot, the tab and slot provide a linking element spaced radially outward from the connecting rod, and wherein the inner and outer members are connected together by the linking element when the recliners are pivoted manually to the unlocked condition, and the inner and outer members are disconnected by the linking element when the load is applied to the seat back in a collision;

each inner member comprises a receptacle that receives a respective end of the connecting rod in non-rotatable engagement, a retaining ring has a plurality of spring fingers that engage the connecting rod and retain the inner member on the connecting rod; and wherein the selective torque transmission joints permit torque to be transmitted between the recliners by the connecting rod when the recliners are pivoted manually in a first rotary direction to the unlocked condition and wherein the lost motion connector prevents torque from being transmitted in a second rotary direction that is opposite the first rotary direction between the recliners by the connecting rod in the event that a load is applied to the seat back in the collision.

2. The vehicle seat of claim 1 wherein the inner member has a cylindrical outer surface and the outer member is cup-shaped and has a cylindrical inner surface that receives the outer surface of the inner member in a nested relationship.

3. The vehicle seat of claim 2 wherein a tab is provided on the inner member that extends radially outward from the outer surface, wherein an arcuate slot is defined by the outer member in the cylindrical inner surface, and wherein the tab is received in the arcuate slot.

4. The vehicle seat of claim 3 wherein the arcuate slot has a first end that is engaged by the tab to transmit torque from the connecting rod to the recliner when the recliners are pivoted manually to the unlocked condition, and wherein the arcuate slot has a second end that is spaced from the tab to thereby provide the lost motion connector.

5. The vehicle seat of claim 1 wherein the torque transmission joints each have a stub shaft that is coaxial with the connecting rod that each connect one of the torque transmission joints to one of the recliners.

6. The vehicle seat of claim 1 wherein a tab is provided on the inner member that extends radially outward from an outer surface of the inner member, wherein an arcuate slot is defined by the outer member in a cylindrical inner surface of the outer member, and wherein the tab is received in the arcuate slot.

7. The vehicle seat of claim 6 wherein the arcuate slot has a first end that is engaged by the tab to transmit torque from the connecting rod to the recliner when the recliners are manually shifted to the unlocked condition, and wherein the arcuate slot has a second end that is spaced from the tab to thereby provide the lost motion connector.

* * * * *